(12) United States Patent
Chopra et al.

(10) Patent No.: US 8,713,554 B1
(45) Date of Patent: Apr. 29, 2014

(54) AUTOMATED HOTFIX HANDLING MODEL

(75) Inventors: Shelesh Chopra, Karnataka (IN);
William Scott, Burlington (CA);
Christopher Sears, Dundas (CA);
Shivashankar Vasanad, Karnataka (IN)

(73) Assignee: EMC Corporation, Hopkinton, MA (US)

( * ) Notice: Subject to any disclaimer, the term of this patent is extended or adjusted under 35 U.S.C. 154(b) by 106 days.

(21) Appl. No.: 13/618,634

(22) Filed: Sep. 14, 2012

(51) Int. Cl.
*G06F 9/44* (2006.01)

(52) U.S. Cl.
USPC ............ 717/168; 717/121; 717/122; 717/170

(58) Field of Classification Search
None
See application file for complete search history.

(56) References Cited

U.S. PATENT DOCUMENTS

| | | | | |
|---|---|---|---|---|
| 5,586,304 A * | 12/1996 | Stupek et al. | ................ | 717/170 |
| 6,763,517 B2 * | 7/2004 | Hines | ............................ | 717/124 |
| 7,020,875 B2 * | 3/2006 | Zweifel et al. | ................ | 717/168 |
| 7,568,183 B1 * | 7/2009 | Hardy et al. | ................... | 717/121 |
| 7,805,719 B2 * | 9/2010 | O'Neill | ......................... | 717/168 |
| 8,151,248 B1 * | 4/2012 | Butler et al. | .................... | 717/124 |
| 8,302,088 B2 * | 10/2012 | Matthiesen | ................... | 717/168 |
| 8,468,516 B1 * | 6/2013 | Chen et al. | ..................... | 717/170 |
| 2004/0230964 A1 * | 11/2004 | Waugh et al. | ................. | 717/168 |
| 2004/0261070 A1 * | 12/2004 | Miller et al. | ................... | 717/170 |
| 2009/0259999 A1 * | 10/2009 | Srinivasan | .................... | 717/170 |
| 2011/0107299 A1 * | 5/2011 | Dehaan | ......................... | 717/121 |
| 2012/0222007 A1 * | 8/2012 | Allen et al. | .................... | 717/122 |
| 2012/0284694 A1 * | 11/2012 | Waugh et al. | ................. | 717/122 |
| 2013/0014083 A1 * | 1/2013 | Martineau | ..................... | 717/122 |
| 2013/0283252 A1 * | 10/2013 | Mannarswamy et al. | .... | 717/168 |

OTHER PUBLICATIONS

Perkins et al., "Automatically patching errors in deployed software," 2009, SOSP '09 Proceedings of the ACM SIGOPS 22nd symposium on Operating systems principles, pp. 87-102.*
Hicks et al., "Dynamic software updating," 2001, Proceedings of the ACM SIGPLAN 2001 conference on Programming language design and implementation, pp. 13-23.*
Sidiroglou et al., "Countering Network Worms Through Automatic Patch Generation," 2003, pp. 1-17, downloaded from the Internet on Feb. 20, 2014 from <url>http://academiccommons.columbia.edu/item/ac:109724.*

* cited by examiner

*Primary Examiner* — Thuy Dao
*Assistant Examiner* — Stephen Berman
(74) *Attorney, Agent, or Firm* — Theodore A. Chen; Krishnendu Gupta

(57) ABSTRACT

This disclosure relates to a method, article of manufacture, and apparatus for automated handling of a hotfix. In some embodiments, this includes obtaining defects submitted to a defect repository, querying the defect repository to obtain a defect, permitting the users to approve the defect as a cumulative hotfix candidate, receiving and storing check-in data corresponding to the cumulative hotfix candidate to a source code repository, approving the check-in data, triggering an automated compiling of a build of the version of the software, examining the build, triggering an automated testing of the build based on a determination that the build is clean, storing the build in a build repository when the automated testing of the build completes without error, and publishing the build.

18 Claims, 3 Drawing Sheets

AUTOMATED HOTFIX HANDLING MODEL

FIELD

The present invention relates generally to computer systems and specifically to systems and methods of releasing computer software.

BACKGROUND

As computer software is becoming more complex, software development is becoming more complicated. Large scale software development effort often requires proper management of and coordination among teams of engineers. Confusion and inefficiency easily arise when the software release process throughout different stages of software development cycle is not carefully executed. Compounding the problem is the fact that each version of a software product must pass through multiple developmental and testing cycles prior to its release, where advancing to the next stage requires the passing of multiple iterations of testing and approval process.

Previously, the process of determining which source modules to collect, collecting the source modules, building a release, testing and finally releasing a fix was tedious and time consuming. Many hours were spent in meetings with software engineers and managers to determine which source modules should be included in which version, and what reported problems were fixed by which source modules, and whether the source modules with new features should be included in a build. In addition to the labor intensive steps involved in source modules management, documents management along the release process is another area that involves a substantial amount of manual process. While it is critical to ensure that documents are properly associated with the correct version and release of software products, the task of preparing, tracking and releasing documents related to a specific version and release of the software product is daunting.

There is a need, therefore, for an improved method or system that automates and streamlines computer software release.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
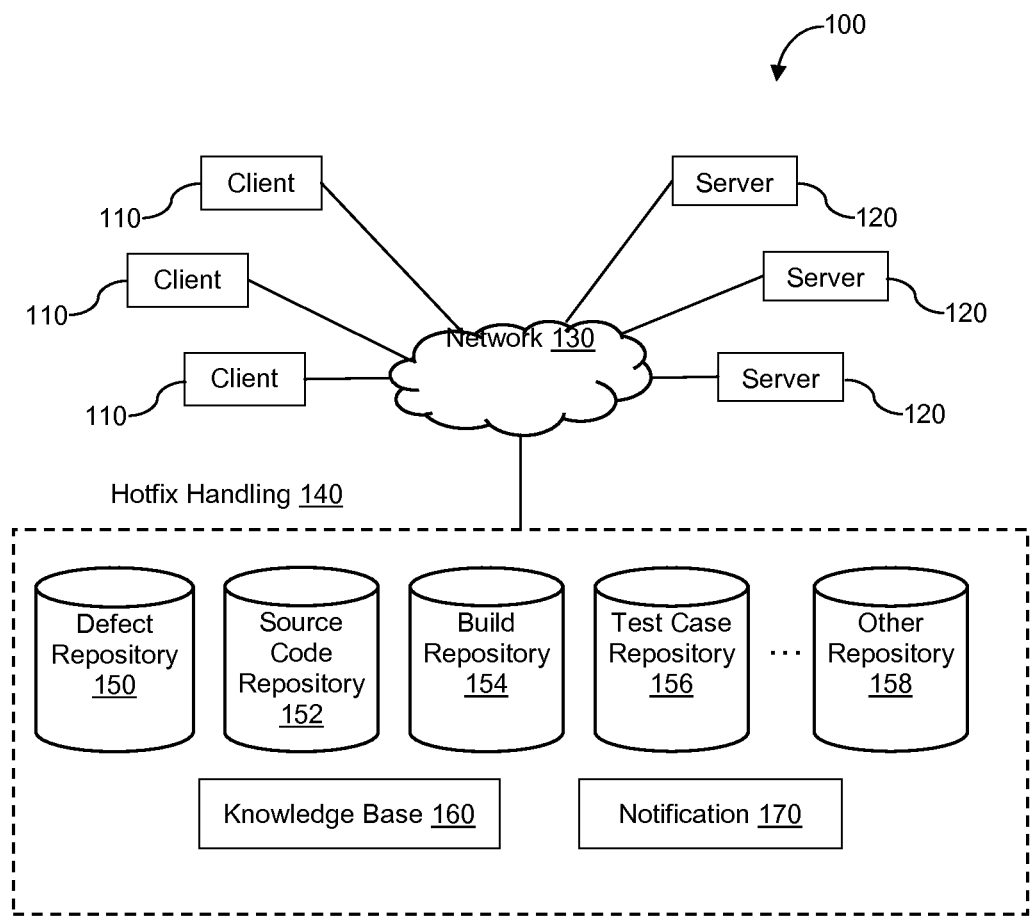
FIG. 1 is a diagram of a system configured to implement an automated hotfix handling model in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

Disclosed herein are methods and systems of automated hotfix handling, including highly automated defect tracking, defect fixing, fix committing, testing, and releasing procedures. Software applications often require updates after major releases to ensure their proper functioning. Such updates may be periodic, or in response to a particular event, e.g. a defect reported by a user. Large pieces of software that significantly change a program may be referred to as service packs. A service pack may be a collection of updates, fixes, or enhancements to a software product delivered in the form of a single installable package. In between the releasing of different versions of service packs, some relatively small in size software packages may be made available to users that aim at fixing problems, such as defects in the source code, usability and/or performance etc. Such software packages, which contain pointed code changes and have shorter software development cycle, are known as hotfixes. Hotfixes play a critical role in any major product line. Service packs and major releases have their own specific schedules. For an enterprise customer, issues such as bugs in source codes, data unavailability, and data loss may require an immediate relief. Thus, hotfixes release process acts as a bridge to get the relief to the customer soon. And accumulation of hotfixes over a period of time may be delivered as cumulative hotfixes.

Even though small in size and short in terms of development cycle, hotfixes still require extensive defect tracking and testing prior to releasing. Current approaches to hotfixes handling often face many challenges. One challenge is the maintenance overhead. The overhead may come from lack of coordination of different hotfixes. For example, a hotfix for an operating system and/or platform may need to be ported to a different operating system and/or platform. Maintaining and tracking multiple hotfixes for multiple operating systems and/or platforms and possibly in different release processes may be overwhelming.

Another challenge is the lack of involvement from critical stake owners. Currently, in almost all the organizations, hotfixes release process is owned fully or predominantly by one team, and there is less of the involvement from other critical stake owners, such as development team, QA team, and support team, among others. Due to lack of involvement in hotfix handling process, different feature owners may not have much visibility in what is accomplished by which hotfix release. Lack of coordination and communication among different teams may cause inefficiency in hotfixes release process.

An additional challenge is presented by the current manual/semi-manual hotfix release process. Current approaches to hotfixes handling often necessitate a user to manually inspect a defect after the defect is reported. The manual inspection may determine if the reported defect belongs to a cumulative hotfix category. After determining the defect is a cumulative hotfix candidate, the user may manually send out notifications to developers. Developers receiving the notification may then work on a fix and submit the fix to a build process before send out manual notification to a testing team. The testing team upon receiving the notification, may put together testing scripts, run tests, and conduct several rounds of interaction with developers to pass the testing phase. Upon a successful test, the hotfix may be manually communicated and distributed to users. Such a manual process is inefficient and error prone.

In some embodiments of the present invention, an automated hotfix handling model may be used to streamline the hotfix release process and overcome some of the challenges noted above. Instead of handling one hotfix at a time, the automated hotfix handling model cumulates multiple hotfixes and involves critical stake owners from multiple teams to formalize the cumulative hotfix (CHF) release process. Throughout the formalized CHF release process, automated notifications facilitate the coordination of more efficient parallel development effort among various teams. And multiple hotfixes for multiple operating systems and/or platforms may be gathered in one CHF to reduce the maintenance overhead.

FIG. 1 illustrates an exemplary environment in which automated hotfix handling model may be implemented, in accordance with some embodiments. Data Storage System 100 may contain Clients 110, Servers 120, and Hotfix Handling module 140 connected by Network 130. Client 110 may represent a system, such as a laptop, a desktop, a mobile device, or a virtual machine, etc., used to generate requests to applications executing in Servers 120. Server 120 may represent a web and/or application server, which executes applications capable of performing tasks requested by users using Clients 110. The applications may perform tasks on data maintained internally or externally and send the result to Clients 110. It should be noted that different modules of the same application may be deployed and executed on different systems to facilitate the performance of tasks. As illustrated by FIG. 1, there may be any number of clients and any number of servers.

Network 130 may provide connectivity between the various systems of FIG. 1 and may be implemented using protocols such as Transmission Control Protocol (TCP) and/or Internet Protocol (IP), well known in the relevant arts. Network 130 may also be implemented to provide support for various storage architectures such as storage area network (SAN), Network-attached Storage (NAS), Direct-attached Storage (DAS), etc.

In some embodiments, Hotfix Handling module 140 may include various repositories, such as Defect Repository 150, Source Code Repository 152, Build Repository 154, Test Case Repository 156, and Other Repository 158, among others. Hotfix Handling module 140 may also include Knowledge Base 160 and Notification 170. Knowledge Base 160, in accordance with some embodiments, may be a non-volatile storage maintaining entries such as recommendations for fixing defects determined in Data Storage System 100. The identified recommendations may include possible solutions, suggestions, and workarounds for fixing the determined defects. The content of the recommendations may be derived from descriptions associated with defects stored in Defect Repository 150 and comments associated with a hotfix stored in Source Code Repository 152, among others. At various stages of the automated hotfix handling model, Notification 170 may be sent out through web pages, RSS feed and/or emails, among others. The content of Notification 170 may be obtained from entries stored in databases, or logs, reports stored in repositories.

Defect Repository 150 may be used to receive defects submitted by users. The defects may include, without limitation, logical errors, functional errors, and/or runtime errors that may cause applications not performing and/or functioning as expected. When submitting a defect, the defect may be associated with various attributes. Such attributes may include a unique defect identifier, a description describing the defect, owner assignment, status of the defect, and the type of the defect, among others.

The status of the defect may be used to facilitate the goals of accountability and closed-loop problem resolution. Critical stake owners may be notified automatically of the status of a defect. Once notified, owners responsible for corresponding actions may take corrective actions and the status of a defect may be changed. Once the status of a defect is changed, more automated notifications may be sent to critical stake owners for further actions. For example, a set of status tracking a defect may be action initiated, assigned-dev, assigned-qa, in progress-dev, in progress-qa, closed-dev, closed-qa, and action closed. After a defect is submitted, whenever the defect status changes, automated notification may be triggered. Critical stake owners may be notified automatically, so that they may take ownership and appropriate actions. The automated process continues until the action is closed.

The type of the defect may indicate whether the defect submitted is a CHF candidate. In some embodiments, the type may be selected from a list of options provided by a defect tracking tool associated with Defect Repository 150. Such defect tracking tool may let a user select from a list of categories indicating the type of the defect submitted. Subcategories indicating whether the defect type is related to data loss, data unavailability, or security vulnerability may be further provided to the user. The subcategories may indicate the severity of the defect. Depending on the severity of the defect, more automated steps may be taken to expedite the availability of the fix to users. For example, if a defect belongs to a subcategory indicating the defect may cause system crash, the defect may qualify for automatic check-in approvals. In some embodiments, the defect tracking tool may be Rational ClearQuest®. ("ClearQuest" is a registered trademark of International Business Machines Corporation in the United States, other countries, or both.) Other defect tracking tools providing similar functionalities may also be used.

Source Code Repository 152 may be used to receive and store check-in data related to CHF. Software Repository 152 may be associated with a version control system to manage the numerous versions of source codes checked in. During code development, developers may check out source codes from Source Code Repository 152 to work on and check them back in at the end of the work session. Version control system, such as concurrent versioning system (CVS), generally keeps tracks of what changes were made to the source codes. Other version control systems providing similar functionalities may also be used. The check-in data stored in Source Code Repository 152 may include source code to fix one or more defects received in Defect Repository 150. Unique defect identifiers stored in Defect Repository 150 may be used as a cross reference to associate source codes with defects. In addition, the check-in data may also include a developer's name, source code file name, product, release, check-in time, total number of lines, number of lines changed, and comments etc.

In some embodiments, the same version control system may also be associated with Build Repository 154. The version control system may execute scripts to compile source codes stored in Source Code Repository 152 and generate executable codes to store in Build Repository 154. Each build may be associated with a version and the version of the CHF. Following a successful build process, the build stored in Build Repository 154 may be tested using test cases stored in Test Case Repository 156. In accordance with some embodiments, the test cases may be mapped to one or more builds to automate the hotfix handling process. A determination of a clean build may trigger automated execution of corresponding test cases. Upon successful completion of testing, a build may be released as postings to users.

Figure 2:
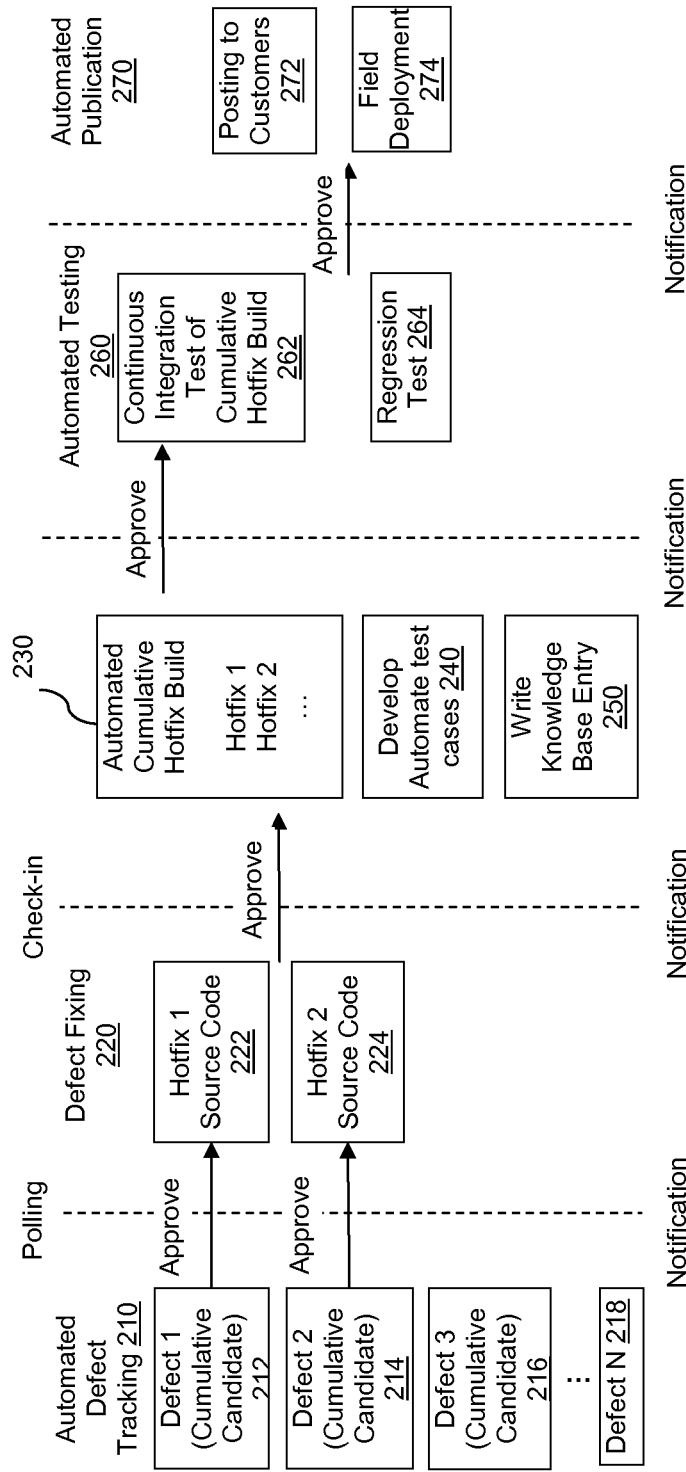
FIG. 2 is a diagram of an automated cumulative hotfix release process in accordance with some embodiments.

FIG. 2 is a block diagram illustrating the automated cumulative hotfix release process, in accordance with some embodiments. During Automated Defect Tracking 210, defects may be submitted. When submitting each defect, the description of the defect as well as the type of the defect may be specified. For example, as illustrated in FIG. 2, Defect 1 212, Defect 2 214, and Defect 3 216 may be categorized as CHF candidate type. On the other hand, Defect N 218 may be categorized as some type other than CHF candidate.

In some embodiments, based on predefined rules, an automated polling process may search through defects submitted to identify one or more types of defects. For example, as illustrated in FIG. 2, a set of predefined rules may be used by the automated polling process to identifying all new defects submitted within CHF candidate category. Applying the rules, Defect 1 212, Defect 2 214, and Defect 3 216 may be identified by the automated polling process. Upon identifying CHF candidate type of defects, an automated notification may be sent to critical stake owners. Critical stake owners may then approve or reject a defect as a CHF candidate. As illustrated in FIG. 2, critical stake owners may approve only Defect 1 212 and Defect 2 214, but reject Defect 3 216. Only approved defects may be worked on during Defect Fixing 220. In contrast, critical stake owners may determine that a fix for Defect 3 216 should not be included in a current cumulative hotfix release, thus reject Defect 3 216.

Once the source codes for Defect Fixing 220 are checked in, an automated notification may be sent to critical stake owners for approval. Upon approval of the check-ins, Automated Cumulative Hotfix Build 230 may start to compile source codes and generate executable codes as a build. The build may cumulatively include hotfixes for various approved defect fixes, such as Hotfix 1, Hotfix 2, etc. In parallel, automated test cases may be developed, denoted as 240 in FIG. 2, to map test cases to the build. Similarly, in parallel, knowledge base entries may be written, denoted as 250 in FIG. 2, based on defects description and comments associated with check-ins.

Once Automated Cumulative Hotfix Build 230 completes, an automated notification may be sent to critical stake owners for approval. Having approved the build, an automated notification may be sent to critical stake owners. Upon approval, Automated Testing 260 may execute the automated test cases to run Continuous Integration Test of Cumulative Fix Build 262. Further, more extensive Regression Test 264 may be conducted. Upon completion of Automated Testing 260, an automated notification may be sent to critical stake owners for approval. Upon approval of a successful testing, Automated Publication 270 may publish Posting to Customers 272 and the published cumulative hotfix may be deployed in field, denoted as 274 in FIG. 2.

The automated cumulative hotfix release process in accordance with some embodiments described herein has several benefits. The formalized process involves critical stake owners. Critical stake owners are automatically notified of the progress from the point of receiving a defect to the final release. The involvement of critical stake owners also helps in prioritizing different tasks and improving efficiency.

For example, an automated notification after polling to critical stake owners may help in prioritizing fixes for Defect 1 212, Defect 2 214, Defect 3 216 . . . Defect N 218. Fixes for a defect such as Defect 1 212 may have a higher priority to work on since it is in a CHF candidate category. In another example, once the fixes for the Defect 1 212 and Defect 2 214 are approved by critical stake owners, automated cumulative hotfix build 230, developing automated test cases 240, and writing knowledge base entries 250 may be in progress simultaneously. The parallel process among various teams is more efficient.

Further, having multiple hotfixes bundled in one CHF eradicates the need of porting requests and improves maintainability. Due to the involvement of critical stake owners, different feature owners have increased visibility of what need to be accomplished in which cumulative hotfix release. Multiple hotfixes for multiple operating systems and/or platforms may be developed and gathered in one CHF to reduce the maintenance overhead.

Figure 3:
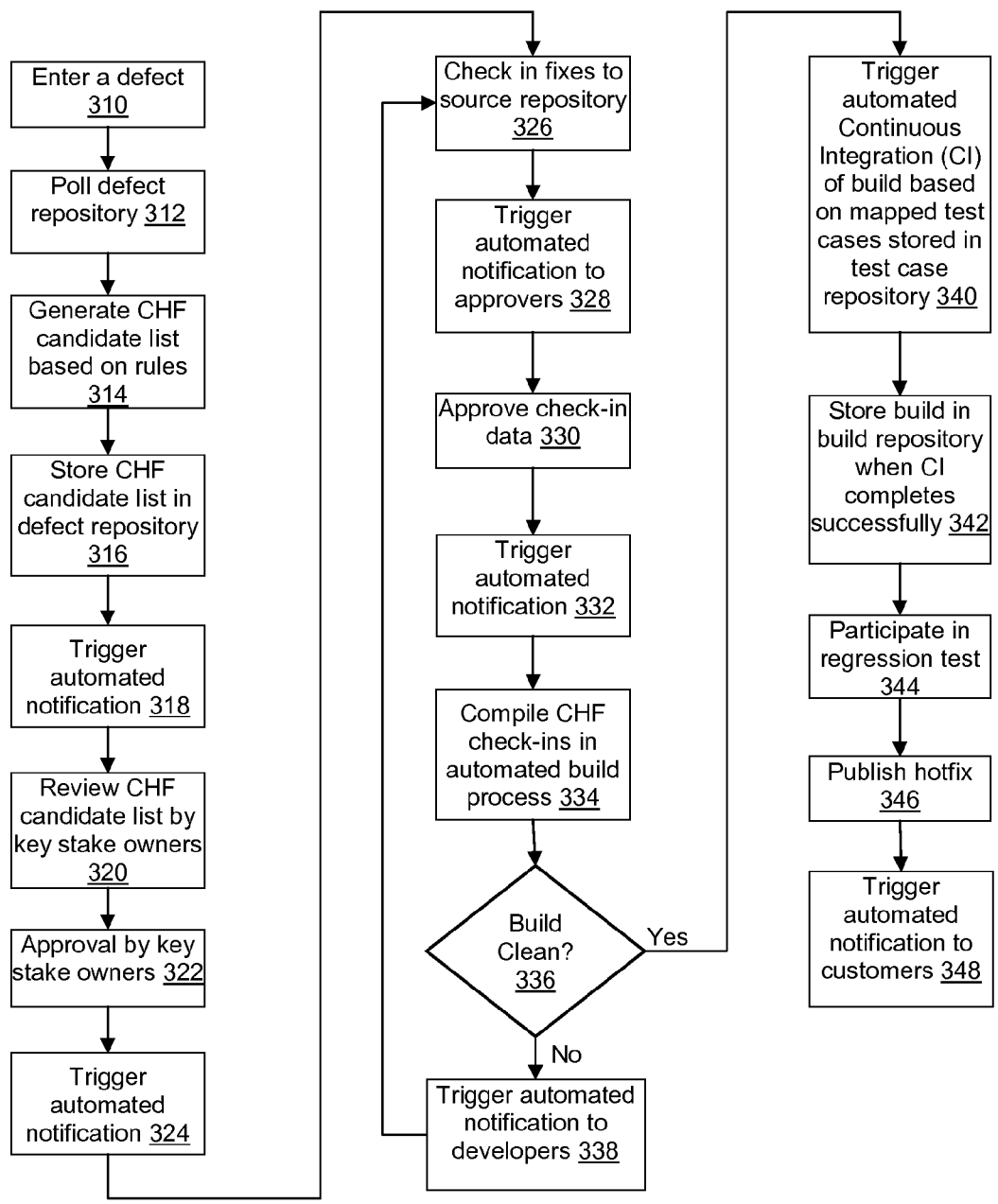
FIG. 3 is a flow chart illustrating a method to perform an automated cumulative hotfix release in accordance with some embodiments.

FIG. 3 illustrates one embodiment of a flowchart of operations for performing an automated cumulative hotfix release. In the depicted embodiment, the automated process begins when one or more defects were submitted to Defect Repository 150 in step 310. The defect may be associated with a description describing the nature of the defect and a keyword indicating the type of the defect, such as whether the defect is a CHF candidate. A polling process in step 213 may query Defect Repository 150 to obtain one or more defects based on a set of predefined rules. The query may look up the keyword associated with each defect submitted and match the keyword with the rules. Based on the rules, in step 314, a CHF candidate list may be generated. The CHF candidate list may include one or more defects submitted to Defect Repository 150, and each defect may be associated with a keyword indicating the defect type as a CHF candidate. Once the CHF candidate list is generated, the list may be stored in Defect Repository 150 in step 316. Further, an automated notification process may be triggered in step 318 to send out updates to critical stake owners. Depending on the notification method each critical stake owner subscribes to, the method of notification may be via email, RSS feed or through website updates. The content of the notification may be derived from reports and/or logs stored in databases or repositories.

Upon receiving the notifications, critical stake owners may approve one or more defects in the CHF candidate list as hotfix candidates, in step 322. Although not shown in FIG. 3, alternatively, critical stake owners may reject one or more defects in the CHF candidate list. The rejected defects will not be part of a current CHF build. Following the approval, an automated notification process may be triggered in step 324 to send out updates to critical stake owners. The automated notification may allow different teams to work on the defects in parallel. For example, developers may start to fix the defect; QA team may start to develop automated test cases for testing the defect; and support team may start to write knowledge base entries to describe the defect and possible fixes for the defect.

In some embodiments, the approval or rejection may be conducted through a user interface associated with Defect Repository 150. For example, the user interface may permit the users to select from a list of options to indicate the status of each defect. One of the options may be approving a defect as a CHF candidate. By selecting the approving option, an approval process may trigger automated notifications. In addition, during the approval process, the defect may be associated with a software release version. Subsequently, the software release version may be associated with corresponding check-ins for a fix of the defect, one or more builds containing the check-ins, one or more automated test cases, and one or more knowledge base entries.

In step 326, fixes for the defect approved may be received and checked in to Source Code Repository 152. The check-in data may correspond to one or more defects. Check-in data may include source code along with meta data associated with the source code. Version control system, such as concurrent versioning system (CVS) may be used to enter and display the meta data. In some embodiments, meta data may include, but not limited to, a defect identifier cross referencing the defect stored in Defect Repository 150, the corresponding CHF release version, the severity, the status, a summary, the product the source code is related to, requester, developer, changes involved, and comments.

Following the check-in process, an automated notification may be triggered to send updates to critical stake owners, in step 328. The check-in data may then be approved in step 330. The approval in step 330 may trigger automated notification to critical stake owners in step 332 as well as trigger an automated compilation process in step 334. The automated compilation process in step 334 may generate a build. Since the check-in data is associated with a CHF release version, the build containing the check-in data may also be associated with the same software release version. Although not shown in FIG. 3, the check-in data may be rejected by critical stake owners. If rejected, the developers may be notified through an automated process. And the rejected check-in data will not be compiled into the CHF build.

Upon completion of the build, the build may be examined in step 336 to determine if the build is clean. If the build contains any errors, the cause of the errors may be examined. For example, one or more source codes may be the cause of the errors. Based on the meta data for the source codes, the developers making changes to the source codes may be located. Automated notification may be sent to the developers in step 338, so that the errors may be analyzed and changes may be made to source code to correct the errors. Subsequently, the new fix may be checked into Source Repository in step 326.

On the other hand, if the build is clean, using the automated test cases developed by QA for the CHF release version, an automated continuous integration (CI) of the build may be triggered in step 340. Continuous integration is a technique that has been practiced in the field of software development and is well known in the art. When CI completes successfully, in step 342, the build may be stored in Build Repository 156. The stored build may participate in more extensive regression test in step 342. Although not shown in FIG. 3, if either CI or the regression test fails, the build may not be released. When the regression test completes without error, the build may be published as a CHF release in step 346, and in step 348, an automated notification may be triggered to let customers know the availability of the cumulative hotfix. Along with the publication of the CHF release, knowledge base entries are also complete by support team.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A processor-executed method comprising:
   receiving defects submitted to a defect repository, wherein each of the defects is associated with an identifier, a status and a keyword indicating the type of the defect;
   querying the defect repository to obtain a list of cumulative hotfix candidates based on a set of rules and the keyword associated with each of the defects, wherein the list of cumulative hotfix candidates includes one or more defects from the defect repository;

storing the list of cumulative hotfix candidates in the defect repository;

approving the list of cumulative hotfix candidates, associating the list of cumulative hotfix candidates to a version;

receiving and storing check-in data corresponding to the list of cumulative hotfix candidates to a source code repository;

approving the check-in data, and triggering an automated compiling of at least one build using the check-in data stored in the source code repository, wherein the at least one build is associated with the version;

upon completion of the build, examining the at least one build;

triggering an automated testing of the at least one build based on a determination that the at least one build is clean, wherein the automated testing uses test cases mapped to the version associated with the at least one build;

storing the at least one build in a build repository; and publishing a cumulative hotfix based on the at least one build stored in the build repository, and sending an automated notification of the cumulative hotfix.

2. The method as recited in claim 1, wherein querying the defect repository to obtain the list of cumulative hotfix candidates based on the set of rules and the keyword associated with each of the defects comprises for each of the defects:

determining for a defect whether a keyword associated with the defect matches the set of rules;

based on a determination that the keyword matches the set of rules, selecting the defect into the list of cumulative hotfix candidates.

3. The method as recited in claim 1, wherein each of the defects is associated with a description.

4. The method as recited in claim 3, wherein approving the check-in data comprises:

upon receiving the automated notification of the check-in, determining whether to approve the check-in data;

upon the determination of approving the check-in data, approving the check-in data; writing test cases for the version; generating documents for the version based on the check-in data and descriptions associated with the defects; storing the documents in a knowledge base repository as entries; and upon the determination of rejecting the check-in data, triggering an automated notification of the rejection.

5. The method as recited in claim 4, wherein publishing the cumulative hotfix includes publishing the cumulative hotfix, retrieving the entries from the knowledge bases, and posting the documents.

6. The method as recited in claim 1, wherein examining the at least one build includes triggering an automated notification based on a determination that the at least one build is not clean, wherein the automated notification includes a request for updated check-in data.

7. The method as recited in claim 1, wherein the automated testing includes at least one automated continuous integration testing and at least one automated regression testing.

8. The method as recited in claim 1, wherein publishing the cumulative hotfix includes selecting a build from the at least one build stored in the build repository based on the version and a determination that automated testing of the build completes without error; and publishing the cumulative hotfix based on the build.

9. The method as recited in claim 1, wherein the check-in data includes the version, source codes to fix the corresponding list of cumulative hotfix candidates, defect identifiers, and comments.

10. The method as recited in claim 1, wherein storing the list of cumulative hotfix candidates in the defect repository includes storing the list of cumulative hotfix candidates in the defect repository, updating statuses associated with the list of cumulative hotfix candidates, and triggering an automated notification of the list of cumulative hotfix candidates.

11. The method as recited in claim 1, wherein approving the list of cumulative hotfix candidates includes approving the list of cumulative hotfix candidates, updating statuses associated with the list of cumulative hotfix candidates, and triggering an automated notification of the approval.

12. The method as recited in claim 1, wherein receiving and storing check-in data corresponding to the list of cumulative hotfix candidates to a source code repository includes receiving and storing check-in data corresponding to the list of cumulative hotfix candidates, updating statuses associated with the list of cumulative hotfix candidates, and triggering an automated notification of the check-in data.

13. The method as recited in claim 1, wherein approving the check-in data includes approving the check-in data, updating statuses associated with the list of cumulative hotfix candidates, and triggering an automated notification.

14. The method as recited in claim 1, wherein triggering an automated testing of the at least one build based on a determination that the at least one build is clean includes triggering an automated testing of the at least one build based on a determination that the at least one build is clean, updating statuses associated with the list of cumulative hotfix candidates, and triggering an automated notification.

15. The method as recited in claim 1, wherein publishing a cumulative hotfix based on the at least one build stored in the build repository includes publishing a cumulative hotfix based on the at least one build stored in the build repository, and updating statuses associated with the list of cumulative hotfix candidates.

16. The method as recited in claim 1, wherein approving the list of cumulative hotfix candidates includes for each of the list of cumulative hotfix candidates, approving a cumulative hotfix candidate by selecting from a list of options, wherein the list of options includes an approve option and a reject option, wherein selecting the approve option triggers an approval process of the cumulative hotfix candidate and updating the status of the cumulative hotfix candidate.

17. A hotfix handling system comprising:

a computer processor;

a memory storing instructions that when executed by the computer processor cause the computer processor to perform acts comprising:

receiving defects submitted to a defect repository, wherein each of the defects is associated with an identifier, a status and a keyword indicating the type of the defect;

querying the defect repository to obtain a list of cumulative hotfix candidates based on a set of rules and the keyword associated with each of the defects, wherein the list of cumulative hotfix candidates includes one or more defects from the defect repository;

storing the list of cumulative hotfix candidates in the defect repository;

approving the list of cumulative hotfix candidates, associating the list of cumulative hotfix candidates to a version;

receiving and storing check-in data corresponding to the list of cumulative hotfix candidates to a source code repository;

approving the check-in data, and triggering an automated compiling of at least one build using the check-in data stored in the source code repository, wherein the at least one build is associated with the version;

upon completion of the build, examining the at least one build;

triggering an automated testing of the at least one build based on a determination that the at least one build is clean, wherein the automated testing uses test cases mapped to the version associated with the at least one build;

storing the at least one build in a build repository; and publishing a cumulative hotfix based on the at least one build stored in the build repository, and sending an automated notification of the cumulative hotfix.

18. A computer program product comprising a non-transitory computer usable medium having machine readable code embodied therein for:

receiving defects submitted to a defect repository, wherein each of the defects is associated with an identifier, a status and a keyword indicating the type of the defect;

querying the defect repository to obtain a list of cumulative hotfix candidates based on a set of rules and the keyword associated with each of the defects, wherein the list of cumulative hotfix candidates includes one or more defects from the defect repository;

storing the list of cumulative hotfix candidates in the defect repository;

approving the list of cumulative hotfix candidates, associating the list of cumulative hotfix candidates to a version;

receiving and storing check-in data corresponding to the list of cumulative hotfix candidates to a source code repository;

approving the check-in data, and triggering an automated compiling of at least one build using the check-in data stored in the source code repository, wherein the at least one build is associated with the version;

upon completion of the build, examining the at least one build;

triggering an automated testing of the at least one build based on a determination that the at least one build is clean, wherein the automated testing uses test cases mapped to the version associated with the at least one build;

storing the at least one build in a build repository; and publishing a cumulative hotfix based on the at least one build stored in the build repository, and sending an automated notification of the cumulative hotfix.

* * * * *